United States Patent [19]

Obuchi et al.

[11] Patent Number: 5,275,792

[45] Date of Patent: Jan. 4, 1994

[54] METHOD OF REMOVING $NO_x$ FROM $NO_x$-CONTAINING GAS

[75] Inventors: Akira Obuchi; Atsushi Ogata; Koichi Mizuno; Akihiko Ohi; Hideo Ohuchi, all of Tsukuba, Japan

[73] Assignee: Agency of Industrial Science and Technology, Japan

[21] Appl. No.: 978,351

[22] Filed: Nov. 18, 1992

[30] Foreign Application Priority Data

Jan. 29, 1992 [JP] Japan .................. 4-038475

[51] Int. Cl.$^5$ .................. B01J 8/00; C01B 21/00
[52] U.S. Cl. .................................. 423/239.1
[58] Field of Search .................. 423/239, 239

[56] References Cited

FOREIGN PATENT DOCUMENTS 53-128023  1/1978  Japan .
56-53730   5/1981  Japan .................. 423/235

Primary Examiner—Gregory A. Heller
Attorney, Agent, or Firm—Lorusso & Loud

[57] ABSTRACT

A nitrogen oxides-containing gas is contacted with a solid catalyst in the presence of methyl tert-butyl ether as a reducing agent for the conversion of the nitrogen oxides into molecular nitrogen. A supported catalyst including an alumina carrier having Pt, Rh or Ru supported thereon is desirably used as the solid catalyst.

5 Claims, 6 Drawing Sheets

METHOD OF REMOVING $NO_x$ FROM $NO_x$-CONTAINING GAS

BACKGROUND OF THE INVENTION

This invention relates generally to prevention of air pollution and, more specifically, to a method of treating a nitrogen oxides-containing gas for the removal of the nitrogen oxides therefrom.

Serious problems are now caused by air pollution, especially by nitrogen oxides ($NO_x$) discharged from internal combustion engines, boilers, nitric acid-related industries, etc. One known technique for the treatment of an $NO_x$-containing waste gas includes a step of contacting the waste gas with a solid catalyst, such as a proton-type mordenite, in the presence of an organic compound, such as propane, as a reducing agent. The known technique, however, is not fully satisfactory with respect to $NO_x$ reducing efficiency.

SUMMARY OF THE INVENTION

It is an object of the present invention to provide a method which can effectively treat an $NO_x$-containing gas for the catalytic removal of the $NO_x$ therefrom with a high $NO_x$ removal rate.

Another object of the present invention is to provide a method which can maintain the high $NO_x$ removal rate for a long period of time.

It is a further object of the present invention to provide a method which can be performed at a relatively low temperature.

In accomplishing the foregoing objects, the present invention provides a method of treating a gas containing nitrogen oxides, comprising a step of contacting the gas with a solid catalyst in the presence of an organic reducing agent which is methyl tert-butyl ether.

The organic reducing agent, methyl tert-butyl ether (hereinafter referred to as MTBE), is preferably vaporized or sprayed for mixing with the gas to be treated prior to the contact with the catalyst. Preferably, MTBE is used in an amount of not greater than 1 mole per mole of the $NO_x$ contained in the gas to be treated. The contact of the $NO_x$-containing gas with the solid catalyst is generally performed at a temperature of 200°–500° C.

The solid catalyst to be used in the present invention is preferably a supported catalyst in which a catalyst metal is supported on a carrier. The carrier is preferably alumina, more preferably activated alumina. As the catalyst metal, the use of Pt, Rh or Ru is particularly preferred. When Pt is used as the catalyst metal, the contact of the $NO_x$-containing gas with the catalyst may be performed at relatively low temperature of 200°–250° C. With Rh or Ru, higher catalytic activity is obtainable at a reaction temperature of 250°–350° C. than that obtained in the case of Pt. These catalyst metals, Pt, Rh and Ru, are supported on the carrier generally in the form of fine particulate having an average particle size of preferably 10–200 Å (angstrom).

BRIEF DESCRIPTION OF THE DRAWINGS

Other objects, features and advantages of the present invention will become apparent from the detailed description of the preferred embodiments of the invention which follows, when considered in light of the accompanying drawings, in which.

DETAILED DESCRIPTION OF THE PREFERRED EMBODIMENTS OF THE INVENTION

The following examples will further illustrate the present invention. Percentages and ppm are by volume except otherwise indicated.

Example 1

Gamma-alumina (1 g) was packed in a tubular reactor, through which a gas containing 1000 ppm of NO, 5% of $O_2$, a given amount of MTBE and balance of He was passed at a flow rate of 160 ml and at a temperature of 300°, 400°, 450°, 500° or 550° C. The amount of MTBE was 280 ppm, 560 ppm or 840 ppm. The gas discharged from the reactor was analyzed by a chemiluminescence-type $NO_x$ detector to measure the amount of $NO_x$ remaining therein. The results are shown by graphs in FIG. 1. The curves 1-3 by the solid lines are the results for the treatment using 280, 560 and 840 ppm of MTBE, respectively.

Comparative Example 1

Figure 1:
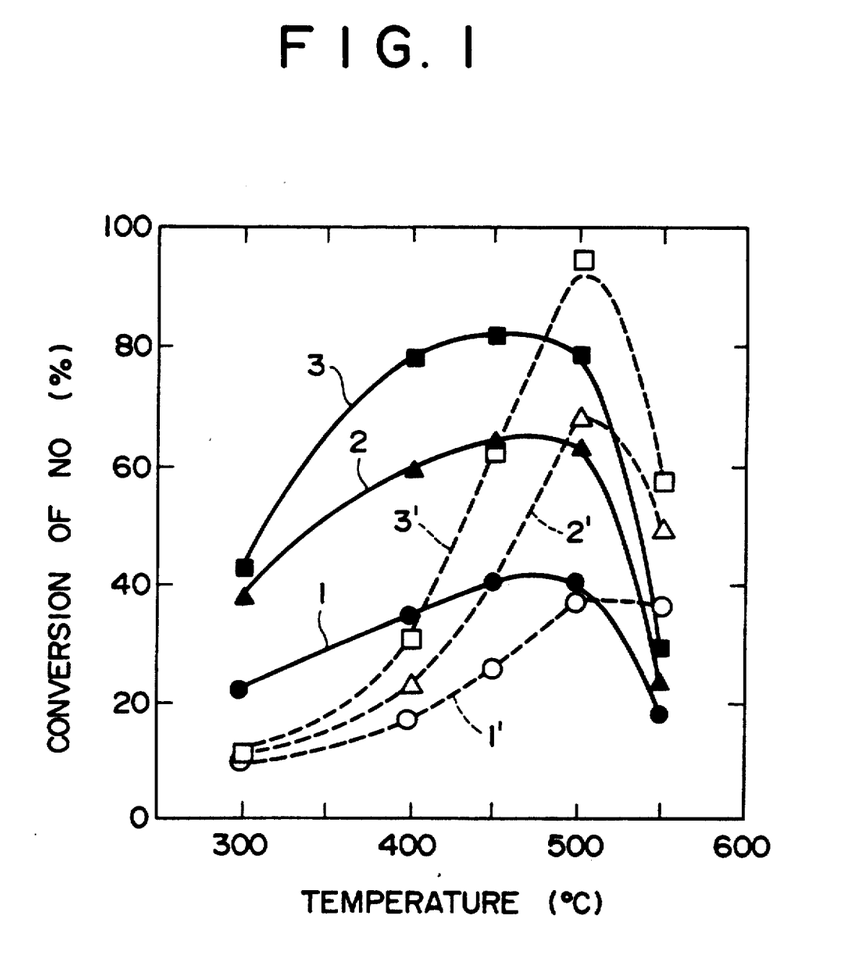
FIG. 1 is a graph showing a relationship between the reaction temperature and the conversion rate of NO obtained in Example 1 and Comparative Example 1.

Example 1 was repeated in the same manner as described except that 450, 900 and 1400 ppm of propylene were substituted for 280, 560 and 840 ppm of MTBE, respectively. The results are shown in FIG. 1. The curves 1'-3' by the dotted line are the results for the treatment using 450, 900 and 1400 ppm of propylene, respectively.

From the results shown in FIG. 1, it will be appreciated that the use of MTBE gives higher $NO_x$ removal effect in comparison with that obtained with propylene at a temperature in the range of 300°–450° C. Since waste gas discharged from a combustion zone has a temperature of about 300°–450° C., it is not necessary to supply an additional heat for performing the $NO_x$ treatment when the method of the present invention is adopted.

Example 2

Gamma-alumina was composited with 1% by weight of Rh, Ru or Pt to obtain supported catalysts. Each supported catalyst (1 g) was packed in a tubular reactor, through which a gas containing 1000 ppm of NO, 5% of $O_2$, 1000 ppm of propylene and balance of He was passed at a flow rate of 160 ml and at a temperature of 200°, 250°, 300°, 400° or 500° C. The gas discharged from the reactor was analyzed by a chemiluminescence-type $NO_x$ detector to measure the amount of $NO_x$ remaining therein. The results are shown by graphs in FIG. 2. The curves 4–6 by the solid line are the results of the treatment using Rh, Ru and Pt, respectively.

Comparative Example 2

Figure 2:
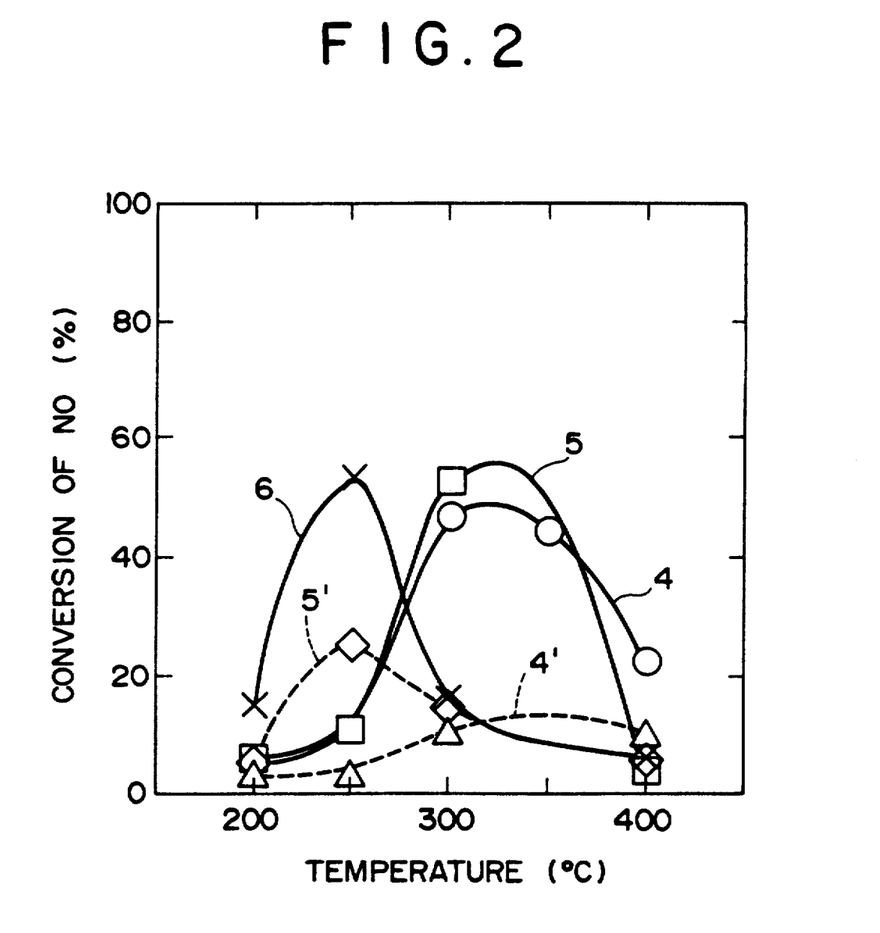
FIG. 2 is a graph, similar to FIG. 1, showing a relationship between the reaction temperature and the conversion rate of NO obtained in Example 2 and Comparative Example 2.

Example 2 was repeated in the same manner as described except that Ir and Pd were each used as catalyst metal. The results are shown in FIG. 2. The curves 4' and 5' by the dotted line are the results of the treatment using Ir and Pd, respectively.

From the results shown in FIG. 2, it is evident that Rh and Ru exhibit high $NO_x$ removal activities at 300°–350° C. and Pt shows high catalytic activities at about 250° C.

Example 3

Figure 3:
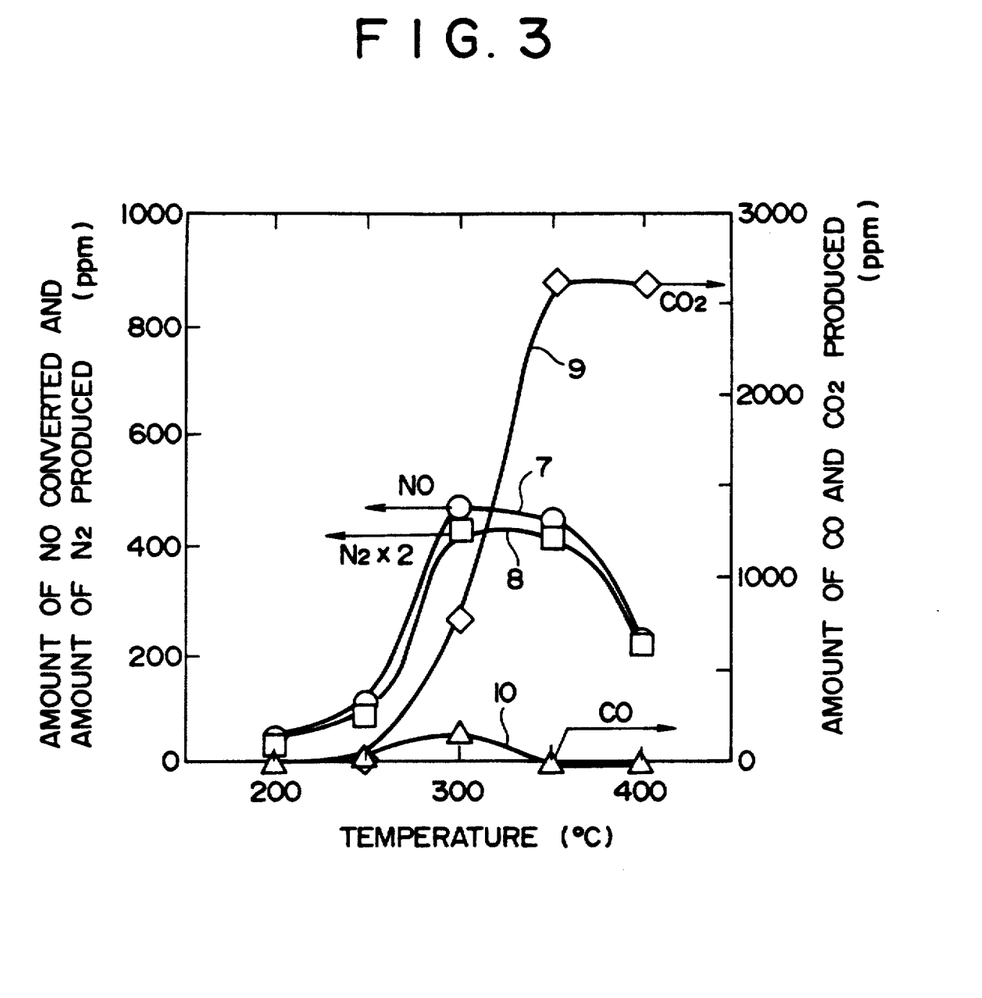
FIG. 3 is a graph showing relationships between the reaction temperature and the conversion NO and between the reaction temperature and the yield of $N_2$, CO and $CO_2$ obtained in Example 3.

The Rh-containing alumina catalyst (1 g) obtained in Example 2 was packed in a tubular reactor, through which a gas containing 1000 ppm of NO, 5% of $O_2$, 1000 ppm of propylene and balance of He was passed at a flow rate of 160 ml and at a temperature of 200°, 250°, 300°, 400° or 500° C. The gas discharged from the reactor was analyzed by a chemiluminescence-type $NO_x$ detector to measure the amount of $NO_x$ remaining therein. In addition, the gas discharged from the reactor was analyzed by gas chromatograph to determine the contents of $N_2$ and CO and by IR absorption gas analyzer to determine the content of $CO_2$. The results are shown in FIG. 3. The curve 7 shows the amount of NO converted, while the curves 8–10 show the amounts of the $N_2$, $CO_2$ and CO produced, respectively. The amount of $N_2$ shown in FIG. 3 is a double of the measured value.

The results of FIG. 3 show that more than 90% of the NO converted is into $N_2$ at a temperature of 300°–350° C.

Example 4

Gamma-alumina was composited with 1% of Rh, Ru, Pt or Pd to obtain supported catalysts. Each supported catalyst (1 g) was packed in a tubular reactor, through which a gas containing 1000 ppm of NO, 5% of $O_2$, 840 ppm of MTBE and balance of He was passed at a flow rate of 160 ml and at a temperature of 200°, 250°, 300°, 400° or 500° C. The gas discharged from the reactor was analyzed by a chemiluminescence-type $NO_x$ detector to measure the amount of $NO_x$ remaining therein. The results are shown by graphs in FIG. 4. The curves 11–14 by the solid line are the results of the treatment using Rh, Ru, Pt and Pd, respectively.

Figure 4:
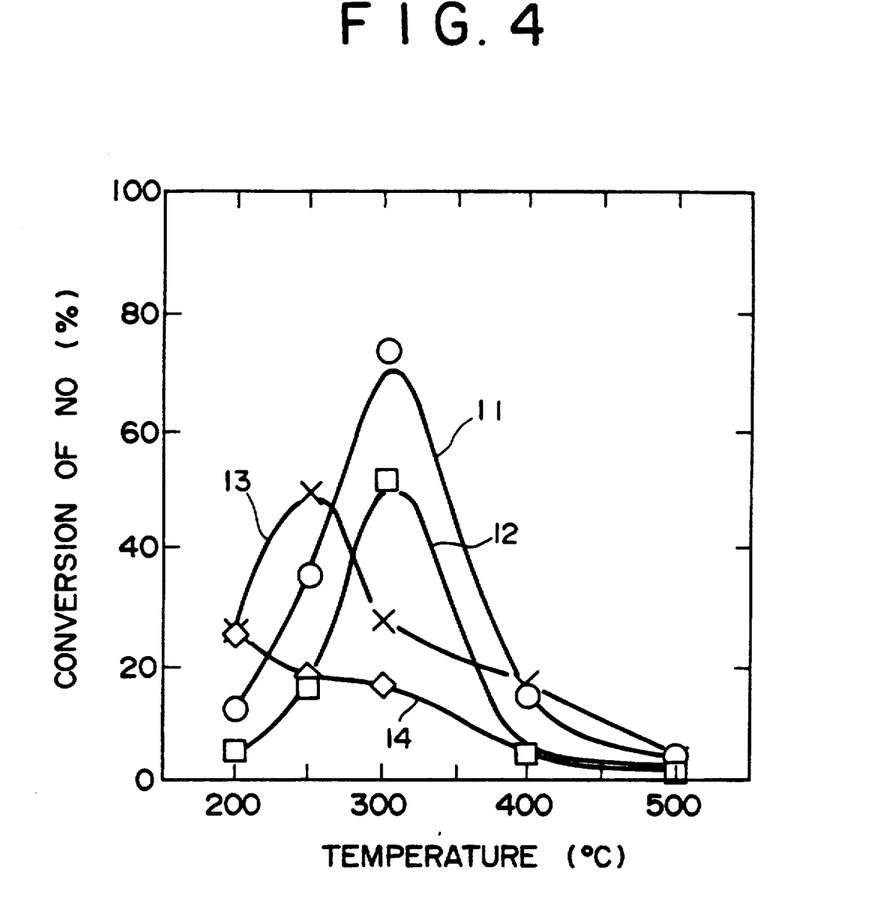
FIGS. 4 and 5 are graphs, similar to FIG. 1, showing a relationship between the reaction temperature and the conversion rate of NO obtained in Examples 4 and 5 and Comparative Examples 3.

From the results shown in FIG. 4, it is evident that Rh and Ru exhibit high $NO_x$ removal activities at about 300° C. and Pt shows high catalytic activities at about 250° C. It is also appreciated that MTBE gives higher $NO_x$ removal activities than polypropylene does.

Example 5

To a columnar honeycomb monolith having a diameter of 30 mm, a height of 50 mm and a cell density of 400 cells/cm² was supported a composite catalyst having a composition shown in Table 1.

TABLE 1

| Catalyst No. | Oxide (amount (% by weight)) | Catalytic Metal (amount (% by weight)) |
|---|---|---|
| 15 | gamma-alumina (10) | Pt (0.2) and Rh (0.04) |
| 16 | gamma-alumina (10) | Pt (0.2) |

Figure 5:
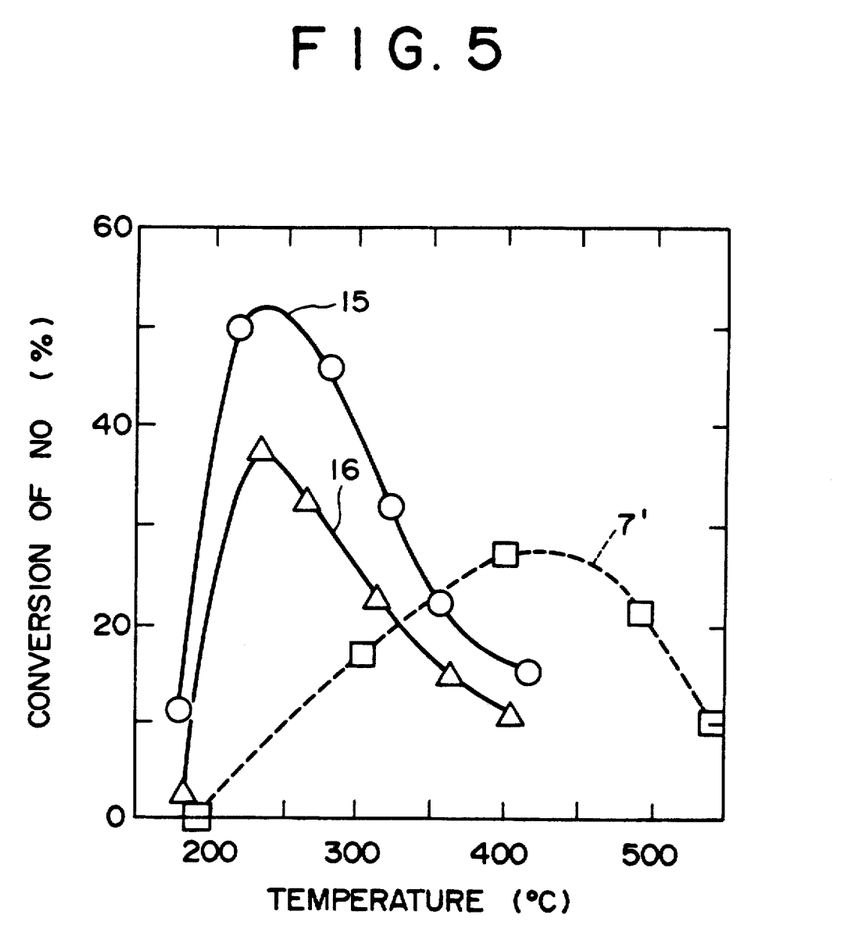

Each of the catalysts was tested for the performance thereof in treatment of an exhaust gas from a diesel engine (single cylinder with prechamber, displacement volume: 0.54 liter, compression ratio: 21.2) driven at engine speed of 1000 rpm with a load of 30% using a sulfur-free gas oil as a fuel. The exhaust gas was filtered for the removal of smoke and was mixed with an equimolar amount (relative to $NO_x$ contained in the exhaust gas) of propylene. The mixture was then passed through the catalyst with a flow rate of 10 liters per minute at various temperatures. The results are shown in FIG. 5. The curves 15 and 16 are the results of the treatment using the catalyst Nos. 15 and 16, respectively.

Comparative Example 3

Example 5 was repeated in the same manner as described except that the catalyst shown in Table 2 was used.

TABLE 2

| Catalyst No. | Oxide (amount (% by weight)) | Catalytic Metal (amount (% by weight)) |
|---|---|---|
| 6' | gamma-alumina (10) | — |
| 7' | ZSM-5 zeolite with Si/Al of 11 (25) | Cu (0.7) |

The results are shown in FIG. 5. The curve 7, by the dotted line shows the results of the treatment using the catalyst No. 7, Substantially no $NO_x$ removal activities were appreciated in the case of the catalyst No. 6'.

From the results shown in FIG. 5, it will be appreciated that the catalysts Nos. 15 and 16 according to the present invention give higher activities at lower temperatures as compared with the conventional Cu/ZSM-5 catalyst which is currently regarded as being the best catalyst.

Example 6

Figure 6:
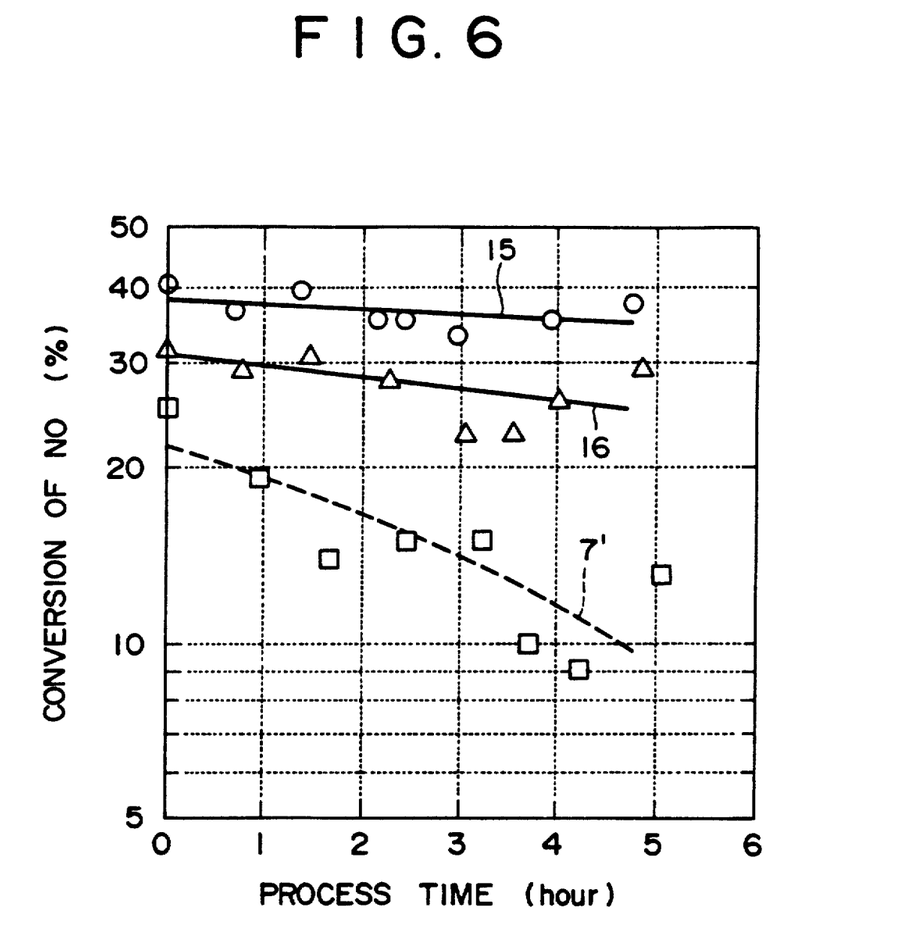
FIG. 6 is a graph showing a relationship between the process time and the conversion rate of NO obtained in Example 6 and Comparative Example 4.

The catalyst No. 15 and 16 obtained in Example 5 were tested for their activity retentivity. Thus, the engine was operated in the same conditions as those in Example 5, except that a gas oil containing 0.4% by weight sulfur was used as the fuel. In the case of the catalyst No. 15, the treatment temperature was maintained at 290° C. while a temperature of 270° C. was used in the case of the catalyst No. 16. The treatment was continued for 5 hours. The change in the catalytic activity with process time is shown in FIG. 6. The curves 15 and 16 are the results of the treatment using the catalyst Nos. 15 and 16, respectively.

Comparative Example 4

Example 6 was repeated in the same manner as described except that the catalyst No. 7, obtained in Comparative Example 3 was used and that the treatment was performed at a temperature of 450° C. The results are shown in FIG. 6. The curve 7, by the dotted line is the results of the treatment using the catalyst No. 7'.

From the results shown in FIG. 6, it will be appreciated that the catalysts Nos. 15 and 16 retain their high activity after 5 hour process time, whereas the catalytic activity of the conventional catalyst No. 7, is considerably lowered with time.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all the changes which come within the meaning and range of equivalency of the claims are therefore intended to be embraced therein.

What is claimed is:

1. A method of treating a gas containing nitrogen oxides comprising: contacting said gas with a solid catalyst, wherein said solid catalyst is a supported catalyst comprising an alumina carrier, and at least one catalyst metal supported on said alumina carrier and selected from the group consisting of Pt, Rh, and Ru, at a temperature of 200°-500° C. and in the presence of methyl tert-butyl ether, to reduce the nitrogen component of said nitrogen oxides to $N_2$.

2. A method as claimed in claim 1, further comprising a step of mixing said methyl tert-butyl ether with said gas before said contacting step.

3. A method as claimed in claim 1, wherein said methyl tert-butyl ether is present in an amount of not greater than 1 mole per mole of said nitrogen oxides.

4. A method as claimed in claim 1, wherein the catalyst metal is Pt and wherein said contacting step is performed at a temperature of 200°-250° C.

5. A method as claimed in claim 1, wherein the catalyst metal is Rh or Ru and wherein said contacting step is performed at a temperature of 250°-350° C.

* * * * *

UNITED STATES PATENT AND TRADEMARK OFFICE
CERTIFICATE OF CORRECTION

PATENT NO. : 5,275,792
DATED : January 4, 1994
INVENTOR(S) : OBUCHI et al

It is certified that error appears in the above-indentified patent and that said Letters Patent is hereby corrected as shown below:

Col. 4, line 27, delete "7," and insert --7'--;

line 29, delete "7," and insert --7'--;

line 54, delete "7," and insert --7'--;

line 57, delete "7," and insert --7'--; and line 62, delete "7," and insert --7'--.

Signed and Sealed this

Ninth Day of August, 1994

Attest:

BRUCE LEHMAN

*Attesting Officer*     *Commissioner of Patents and Trademarks*